United States Patent [19]
Akel et al.

[11] Patent Number: 5,457,305
[45] Date of Patent: Oct. 10, 1995

[54] DISTRIBUTED ON-LINE MONEY ACCESS CARD TRANSACTION PROCESSING SYSTEM

[76] Inventors: William S. Akel; Paul K. Schilling; Eric L. Solberg, all of 5460 White Oak Ave., A-336, Encino, Calif. 91316

[21] Appl. No.: 221,686

[22] Filed: Mar. 31, 1994

[51] Int. Cl.⁶ .................................................. G06F 17/00
[52] U.S. Cl. .......................................... 235/379; 364/408
[58] Field of Search .............................. 235/379; 902/10; 364/408

[56] References Cited

U.S. PATENT DOCUMENTS

| | | | |
|---|---|---|---|
| 4,672,377 | 6/1987 | Murphy et al. | 235/375 X |
| 5,220,157 | 6/1993 | Martin et al. | 235/379 |

FOREIGN PATENT DOCUMENTS

| | | |
|---|---|---|
| 60-134968 | 7/1985 | Japan. |
| 60-156165 | 8/1985 | Japan. |

*Primary Examiner*—John Shepperd
*Assistant Examiner*—Michael G. Lee
*Attorney, Agent, or Firm*—Albert O. Cota

[57] ABSTRACT

A distributed on-line transaction processing system (10) that functions with to any existing credit card and debit bank card processing center (18). The system (10) consists of a customer data-input station (14), a customer service station (16) and a customer transaction booth (20). The system is operated by a primary distributed on-line transaction processing software (30) and two secondary software programs (32, 34). A system transaction begins when a walk-up customer starts the system by passing a card through a magnetic card reader (14B) located in the customer data-input station (14). The customer enters the requested transaction on a touch-screen unit (14C) and the transaction is sent to the customer service station (16). At the station (16), the transaction is processed and sent to the credit and debit bank card processing center (18) where the transaction is either approved or disapproved. If an approval is given, a check corresponding to the approved amount, is printed on a printer (16C) located in the customer service station (16). The customer then walks up to a customer transaction booth (20) where the check is converted to a cash payment upon proper identification disclosure.

20 Claims, 23 Drawing Sheets

TASK MANAGER MODULE

USER INTERFACE MODULE
MAIN MENU
AUTHORIZATION (CONTINUED)

USER INTERFACE MODULE
MAIN MENU
PRINT SETTLEMENT

USER INTERFACE MODULE
MAIN MENU
INPUT RE-ORDER INVENTORY

User Interface Module
MAIN MENU
SYSTEM MAINTENANCE

User Interface Module
MAIN MENU
SYSTEM SHUTDOWN

COMMUNICATIONS MODULE *CONTINUED*

PRINT MODULE *CONTINUED*

Stripe Reader Module

Touch Screen Module

DISTRIBUTED ON-LINE MONEY ACCESS CARD TRANSACTION PROCESSING SYSTEM

TECHNICAL FIELD

The invention pertains to the general field of credit card cash advance systems and more particularly to an improved and simplified client-operated system that interfaces with any existing bank card authorization system.

BACKGROUND ART

Computer system client-operated financial transactions fall into two primary categories: 1) cash withdrawals, such as those from an Automated Teller Machine (ATM), and 2) credit card cash advances (CCCA). In the first scenario, cash withdrawals are the method for obtaining money, and this transaction is debited against the customer's bank account. If enough money is available in the customer's account the transaction will be approved, otherwise, the transaction is rejected. Industry statistics indicate that most customers have a limited amount of money on hand in their account, and ATM's will only allow the withdrawal of a certain money limit each day. Additionally, ATM's require sizeable space for operation, restrictions exist on the credit and debit cards used for operation, the operation and maintenance of ATM's are expensive, including "cash restocking" regularly, and ATM's do not provide any management information with regard to direct marketing and other promotional activities.

Credit card cash advance (CCCA) operations, however, allow the customer to advance, as opposed to withdraw, cash against their available line of credit on their credit card. The number of transactions per day are not limited and the money received is strictly dependent on the customers available line of credit and the allowable limit by the location. CCCA primarily use preprinted checks, as opposed to a receipt, printed with the customer's credit card number, and signed by the customer as receipt for the money received.

Both of the above described financial transaction system are typically comprised of centralized computer systems in one location that control all the available locations. In other words, when the central computer system is inoperative, it affects all remote locations. This centralized computer approach is not uncommon for transaction oriented services; however, its undesirable limitations are solved by the instant invention. The Credit Card Cash Advance (CCCA) market is not widely understood by either the consumers who use credit cards for cash advances or the establishments which support these transactions for their customers. Currently there are two primary markets for CCCA 1) the gambling and leisure industry, and 2) the "over-the-counter" public money. Additional markets that could be expanded include: hotels, government agencies, airports, universities, and any other high-traffic public locations where people may need immediate cash. Market research indicates that this expanded market could sustain $100 million a year in fee revenue while the two primary market areas in the United States currently sustain over $200 million a year in fee revenue.

In the United States, the CCCA market place is extremely limited and is primarily controlled by two companies. The first and major company operates a computerized check cashing system that includes check authorization resources and telecommunication billing sources; the second company is primarily concerned with controlling the disbursing of "over-the-counter" public money through electronic funds transfer.

The major company services the gaming and leisure industry where the principal form of money exchange is cash. Therefore, the cash advance system must be quick, convenient and accurate. The current cash advance systems used by the "casinos" appear to be operated and controlled by more than one computer system. However, in reality, all systems are owned by the same company and use the same computer system. Therefore, when one customer location becomes inoperative so do all other customer locations. This centralized computer approach is not uncommon for transactions oriented services and its undesirable limitations is one of the problems together with logistics problems that are solved by the instant invention.

The ATM has made it easier for banks and financial institutions to satisfy their customer's needs for fast and convenient withdrawals. The ATM service provider receives a percentage of the transaction fee that is charged by the ATM device. When comparing the utility of ATM's versus CCCA, it is well to remember that ATM's facilitate a withdrawal transaction and not a cash advance. Therefore, the number of transactions are limited as well as the amount of money received which in turns, limits the benefits received by the customer.

A search of the prior art did not disclose any patents or literature that read directly on the claims of the instant invention. However, U.S. Pat. No. 5,751,682 issued to Higashiyama, et al on 29 Dec. 1992 is considered related. This patent discloses a method and structure for processing and clearing checks in a timely manner. A check recipient utilizes hardware and software to gather data from a check and then process the check. The hardware includes a reader for reading the Magnetic Ink Character Recognition (MICR) printed on the check, and means for associating this data with information pertaining to the transaction. This information is combined in a data record which is stored for future batch data transmission to a clearing house or the issuing bank. The invention also provide means for determining if the check information of a particular check is to be communicated in real time or in the batch mode.

DISCLOSURE OF THE INVENTION

The distributed on-line money access card transaction processing system is designed to provide a multi-tasking stand-alone financial transaction processing system. The system consists of a customer data-input station that is in the form of a kiosk, a customer service station, a credit and debit bank card processing center, a customer transaction booth and a distributed on-line money access card transaction processing software which operates the system.

The customer data input station includes a bank card reader that reads various credit and debit bank cards, a touchscreen unit that allows a customer to enter transaction requests and receive instructions relating to that request, and a printer that prints customers transaction receipts. This station is connected to the customer service station which includes at least one workstation computer that processes the customer transaction data and a laser printer that prints the customer checks corresponding to an approved request. The transaction request processed by the customer service station is sent via a modem to the credit and debit bankcard processing center.

The processing center will either approve or disapprove the customer's transaction request. If a transaction is disapproved, the reasons for the disapproval are displayed in the bank card reader and/or touchscreen unit located in the customer's data input station. Conversely, if the transaction is approved, the approval message is displayed in both or either of the customer's data input station, and a check corresponding to the transaction amount is printed on the laser printer located in the customer service center. The customer then walks over to the customer transaction booth where the check is converted for a cash payment.

In view of the above disclosure it is the primary object of the invention to provide a distributed on-line money access card transaction processing system that is accurate, convenient and customer friendly.

In addition to the primary object it is also an object of the invention to produce an invention that:

is reliable and easily maintained, can be located in various high pedestrian traffic locations, can be easily exported to provide additional financial services, is cost effective from both a manufacturer, and consumer points of view.

provides lower customer transaction fees with direct marketing and promotional activities for customer loyalty.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
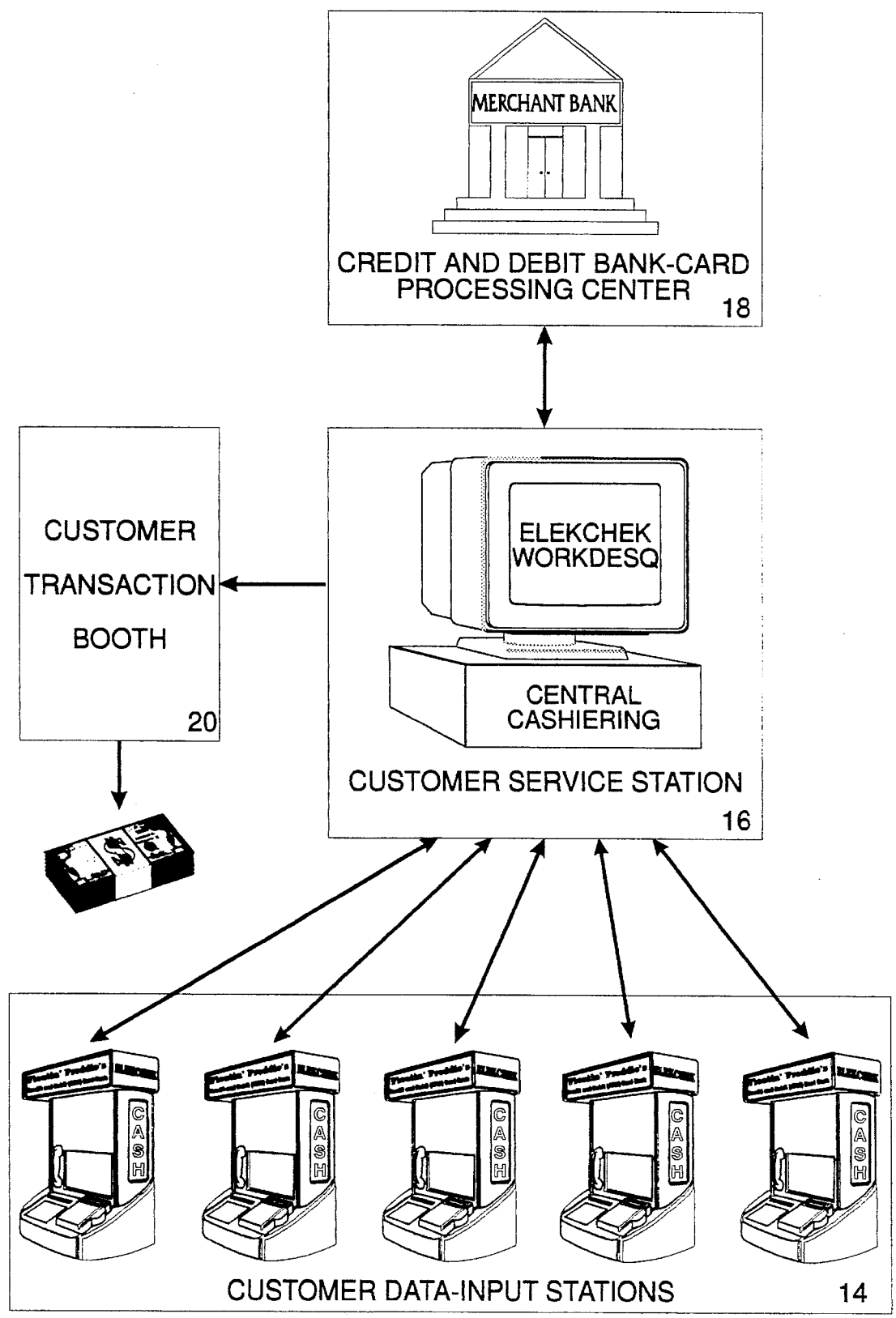
FIG. 1 is an overall block diagram of the distributed on-line money access card transaction processing system.

The best mode for carrying out the invention is presented in terms of a preferred embodiment that allows the timely processing of consumer credit cards and debit bank cards. The preferred embodiment as shown in FIGS. 1–22, is comprised of a distributed on-line money access card transaction processing system 10 that consists of a customer data-input/service station 12 that is further comprised of at least one customer data-input station 14 and a customer service station 16; a credit and debit bank card processing center 18; and a customer transaction booth 20. The above hardware elements operate with a primary distributed on-line money access card transaction processing software 30 and two secondary programs entitled a point of sale software program 32 and a distributed on-line money access card transaction software program 34.

Figure 2:
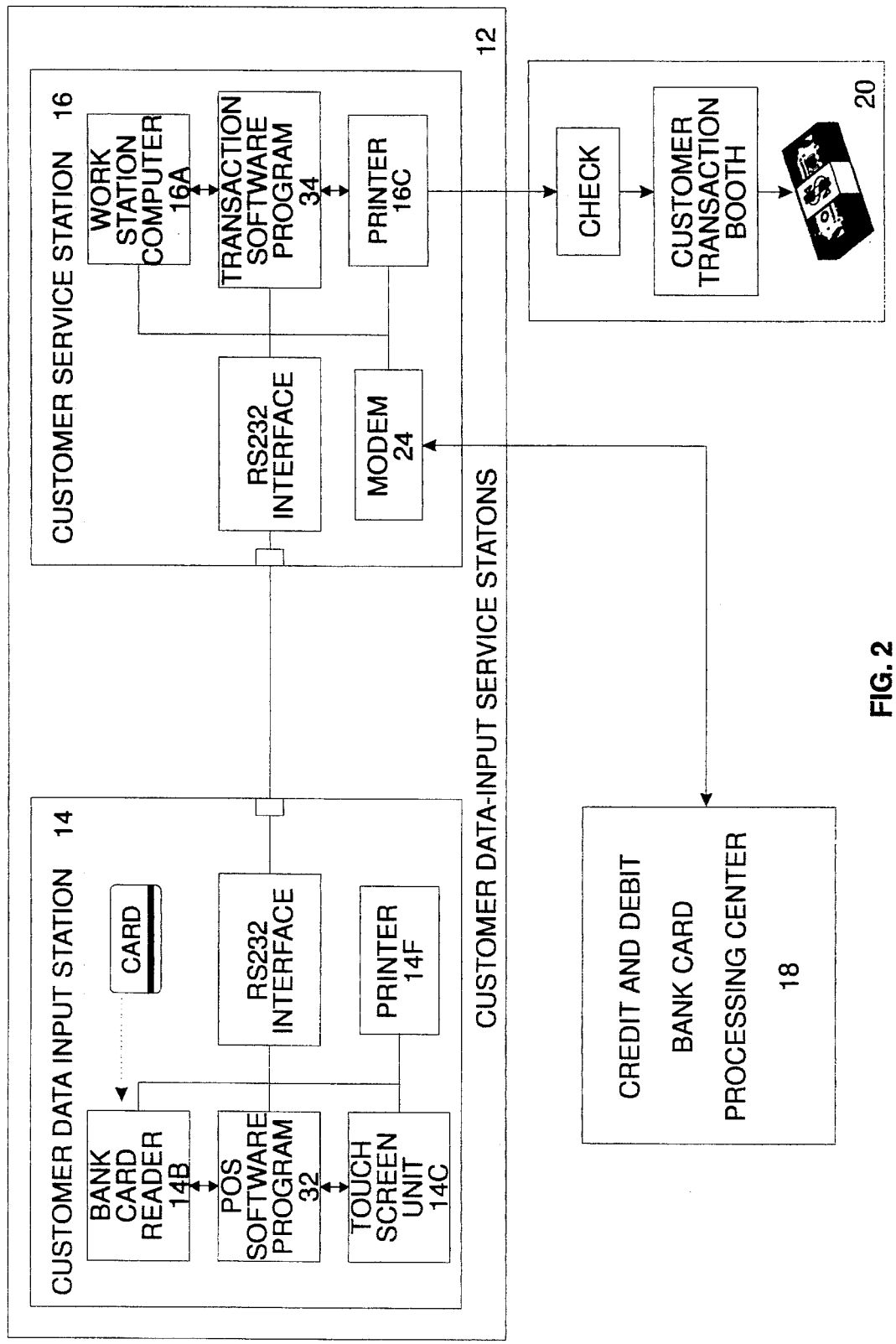
FIG. 2 is a block diagram of the system showing the interface between a customer data input service station, which includes a customer data input station and a customer service station, a credit and debit bank card processing center, and a customer transaction booth.

The overall distributed on-line money access card transaction processing system 10 is shown in FIG. 1. The figure depicts broadly the interface of the customer data-input service station 12, which includes the customer data-input station 14 and the customer service station 16, with the customer transaction booth 20 and the credit and debit bank card processing center 18. As shown in FIG. 2, the customer data input station 14 interfaces and communicates with the customer service station 16 by means of a serial RS232 port 22. The interface and communication between the customer service station 16 and the credit and debit bank card processing center 18 is by means of a conventional modem 24.

The customer data-input station 14, is preferably configured in the form of a kiosk 14A. The system 10 utilizes several kiosk's as shown in FIG. 1, that are located in an easily accessible location such as in shopping malls, airports and other high-traffic public locations. The kiosks high-tech units are designed and embellished to differ from other non-related kiosk's that may be located in the same area and are further designed to fit and compliment the surroundings of the location environment.

The customer data-input station 14 consists of a means for accepting and reading a variety of customer credit cards i.e., Visa$^{SM}$, Mastercard$^{SM}$, Discover$^{SM}$, American Express$^{SM}$ and debit bank cards i.e., ATM cards. The means preferably consists of a bank card reader 14B also known as a magnetic card strip reader. The station includes a touchscreen unit 14C or a keypad 14D that functions in combination with an alpha-numeric display 14E. These units function to receive and display the customer's transaction request, to query the customer and to encrypt the customer transaction data. The station 14 also includes a printer 14F that provides the customer with a receipt listing the transaction data.

All the functions of the customer data-input station 14 are operated by the local point of sale (POS) software program 32 that is located in the station 14. The means for interfacing and communicating with the customer service station 16 is by a cable connected to serial RS232 port located in both the station 14 and 16 as shown best in FIG. 2.

The customer service station 16 as shown in FIG. 2, includes at least one workstation computer 16A. This computer, which is operated by the distributed on-line money access card transaction software program 34, has means for receiving and processing the customer data received from the customer data input station 14. The customer processed data is applied via the modem 24 to the credit and debit bank card processing center 18. If the transaction is not approved by the center 18, the reasons for the disapproval are presented to the customer on the touchscreen unit 14C or the alpha-numeric display 14E.

If an approval is received from the center 18, a printer 16C connected to the workstation computer 16A is activated. The printer has means for electronically printing, on demand, a customer's check that corresponds to the accepted customer transaction. The printer 16C is preferably a laser printer that prints the checks from electronic images stored in the laser printer using blank check stockpaper and Magnetic Ink Character Recognition (MICR) toner. The received check is given to the customer at a conveniently located customer transaction booth 20 where the customer's check is converted to cash or some other method of payment. Before the cash is received, the customer must present a proper identification and sign the check.

In summary, the distributed on-line money access card transaction processing system 10 is designed to provide an improved credit bank card and debit bank card system. To utilize the system, the following simple steps are taken:

a) The customer walks up to a customer data-input station 14 which preferably is in the form of an attractive and functional kiosk. Within the kiosk, is located a card reader 14B and a touchscreen unit 14C or a keypad 14D with an alpha-numeric display 14E.

b) Customer passes a credit card or bank debit card across the card reader 14B to initiate a transaction, c) Customer selects the amount of the transaction by touching appropriate sections of the touchscreen unit 14C or the keys on the keypad 14D.

d) customer views touchscreen to determine if the transaction has been approved or rejected. If a rejection is received, the reason for the rejection is displayed on the touchscreen 14C or alpha-numeric display 14E. If an approval is received, the message is displayed and a check is electronically printed with the approved transaction amount on a laser printer 16C located in the customer service station 16.

e) customer then proceeds to the customer transaction booth 20. Where when proper identification is presented, the customer receives a cash payment or the like.

Figure 5:
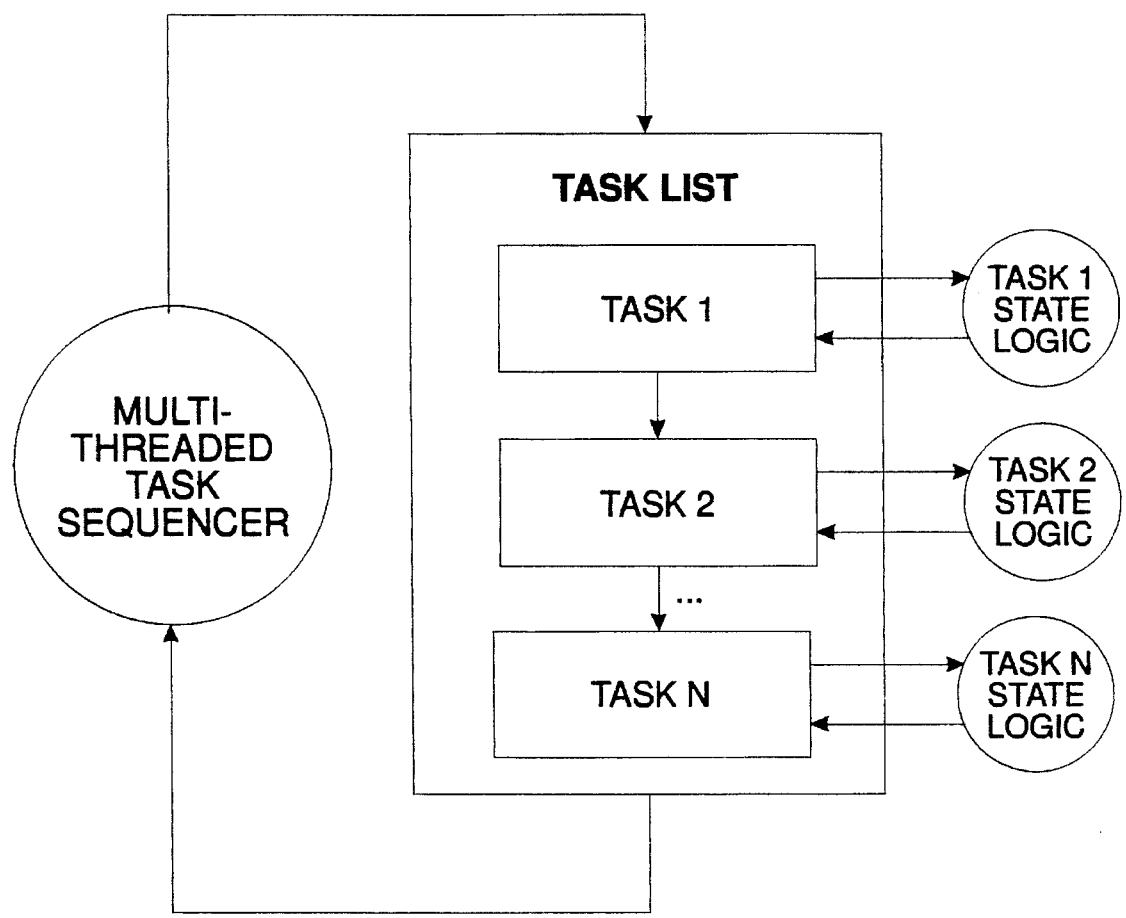
FIG. 5 is a block diagram of the task manager showing multi-threaded task sequences that operates a plurality of tasks.
Figure 6:
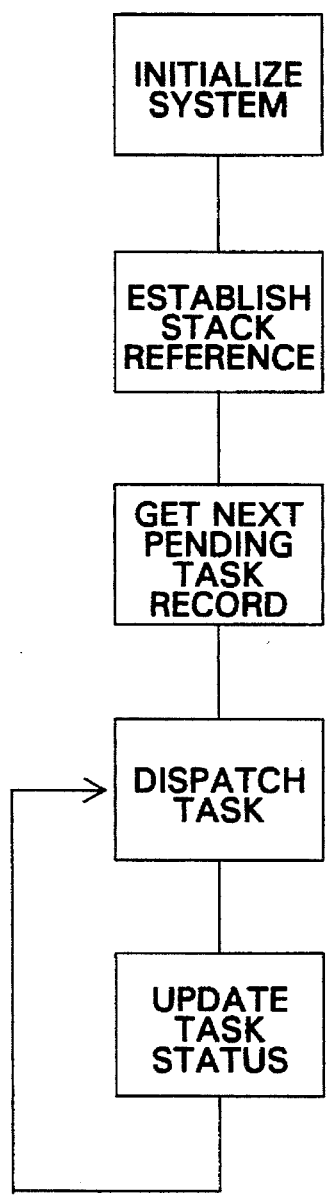
FIGS. 6–22 are flow diagrams of the system software program.
Figure 7:
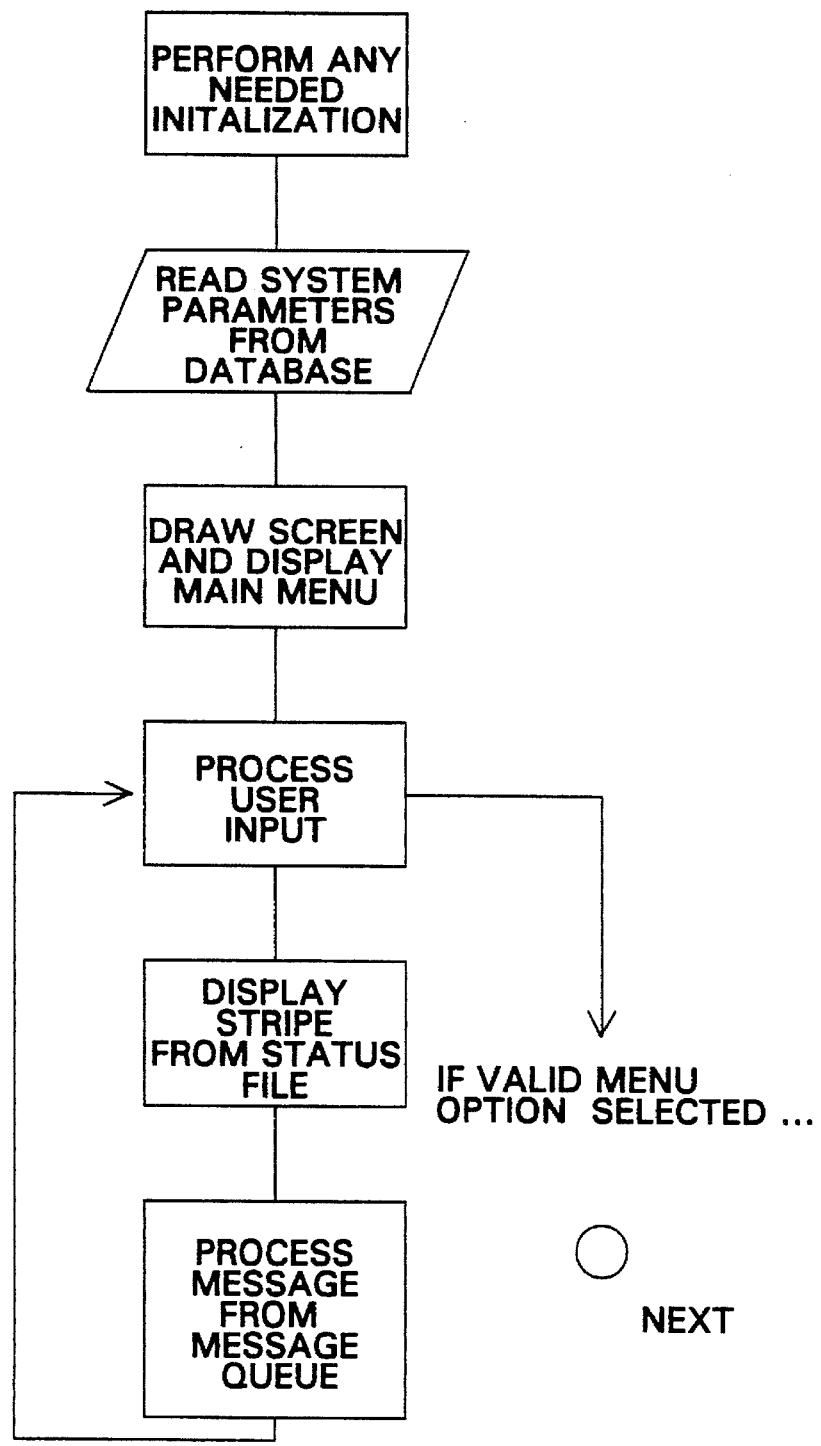
Figure 8:
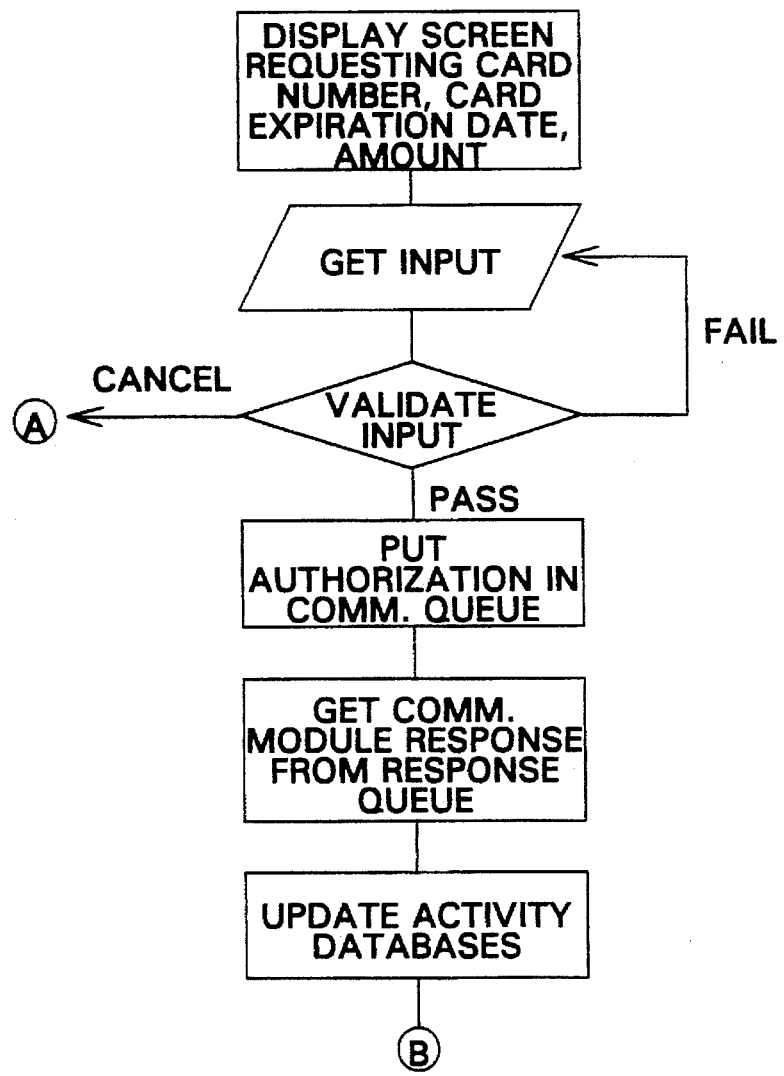
Figure 9:
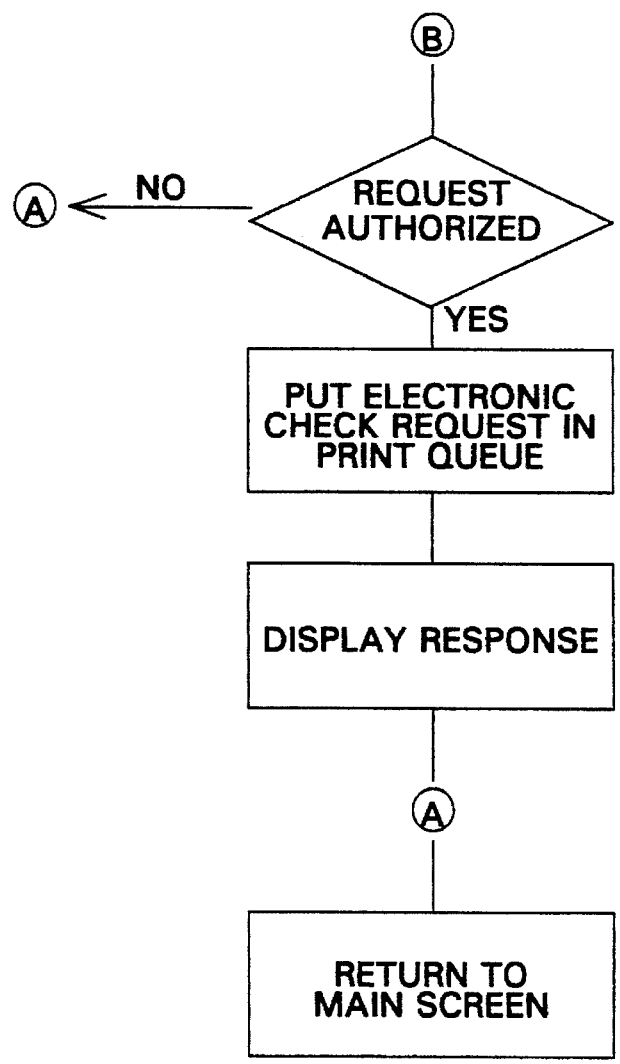
Figure 10:
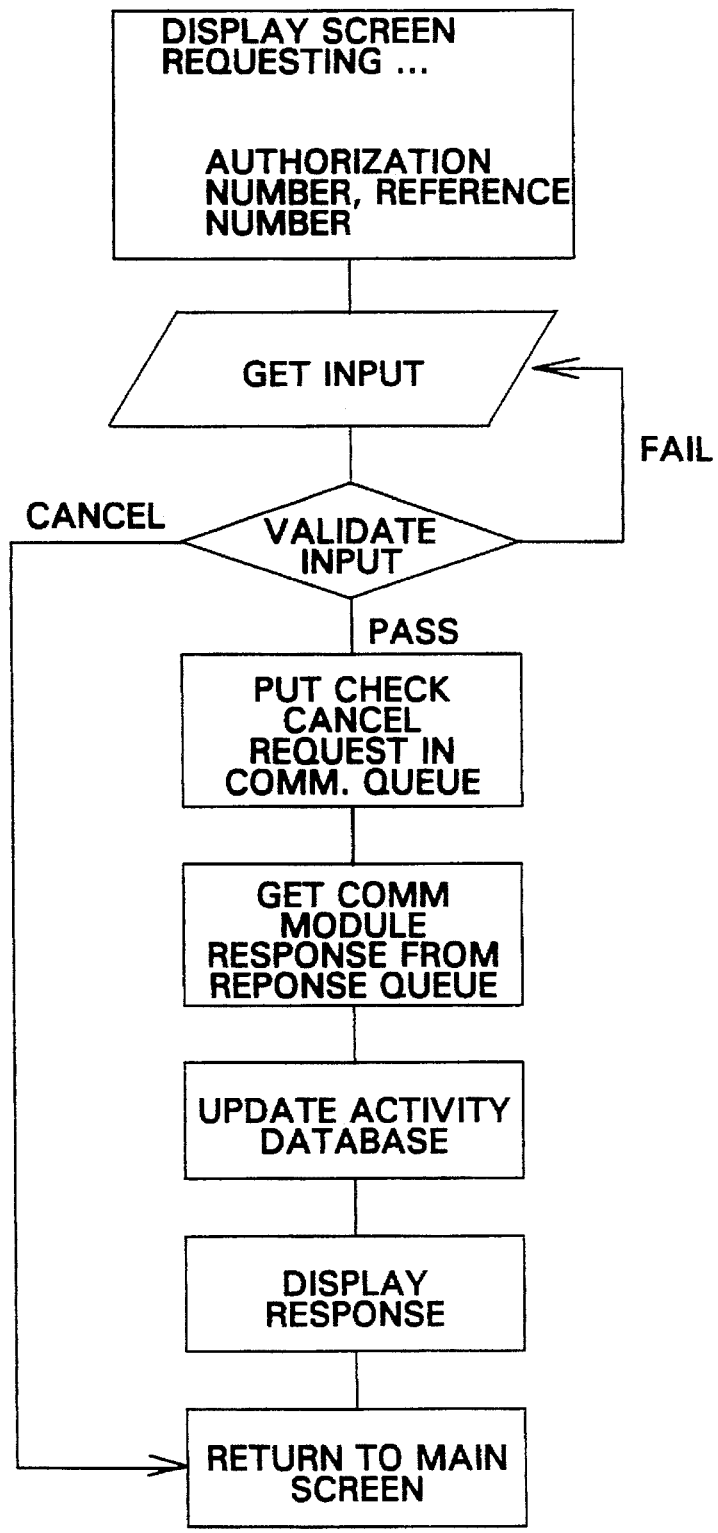
Figure 11:
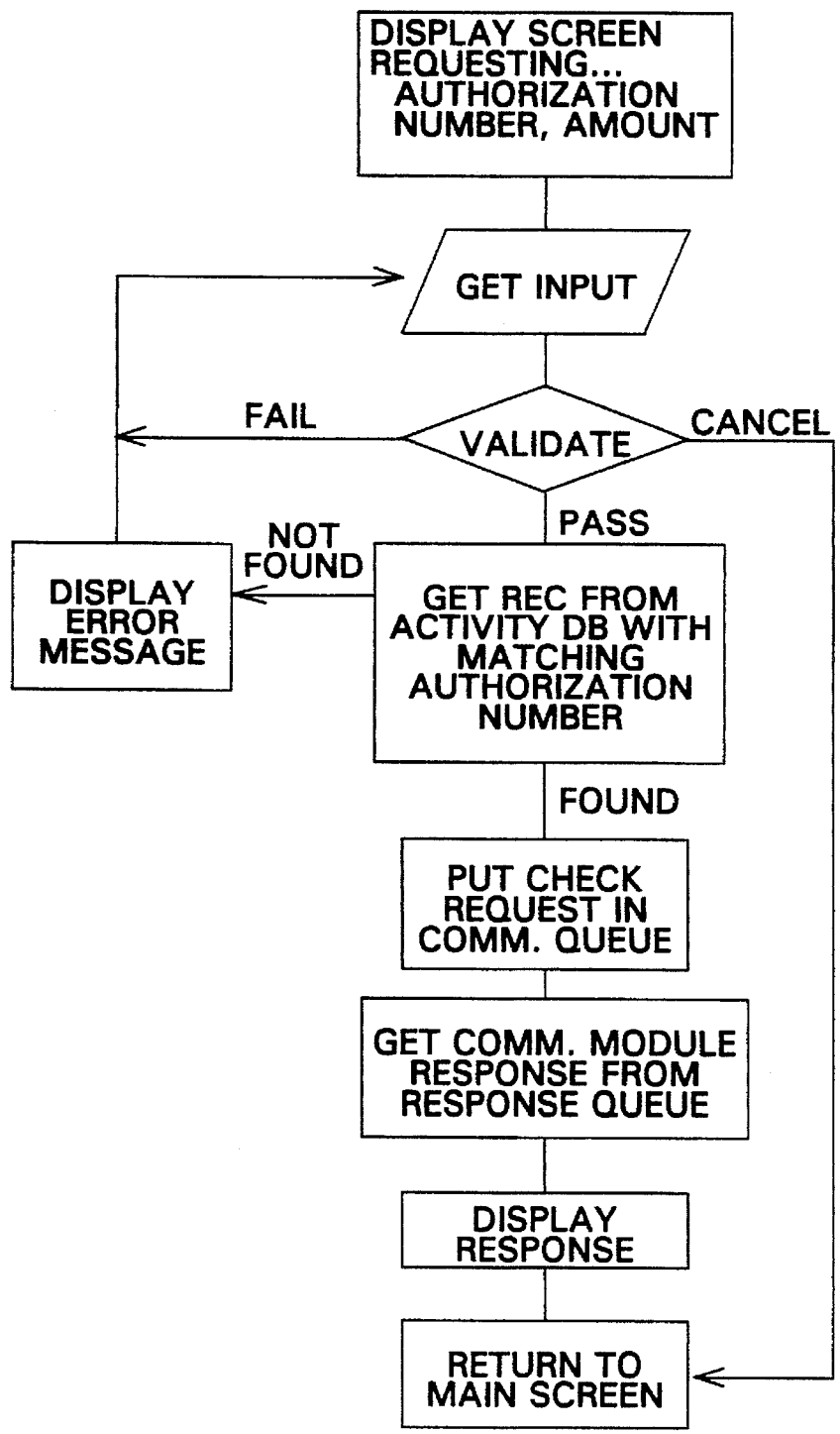
Figure 12:
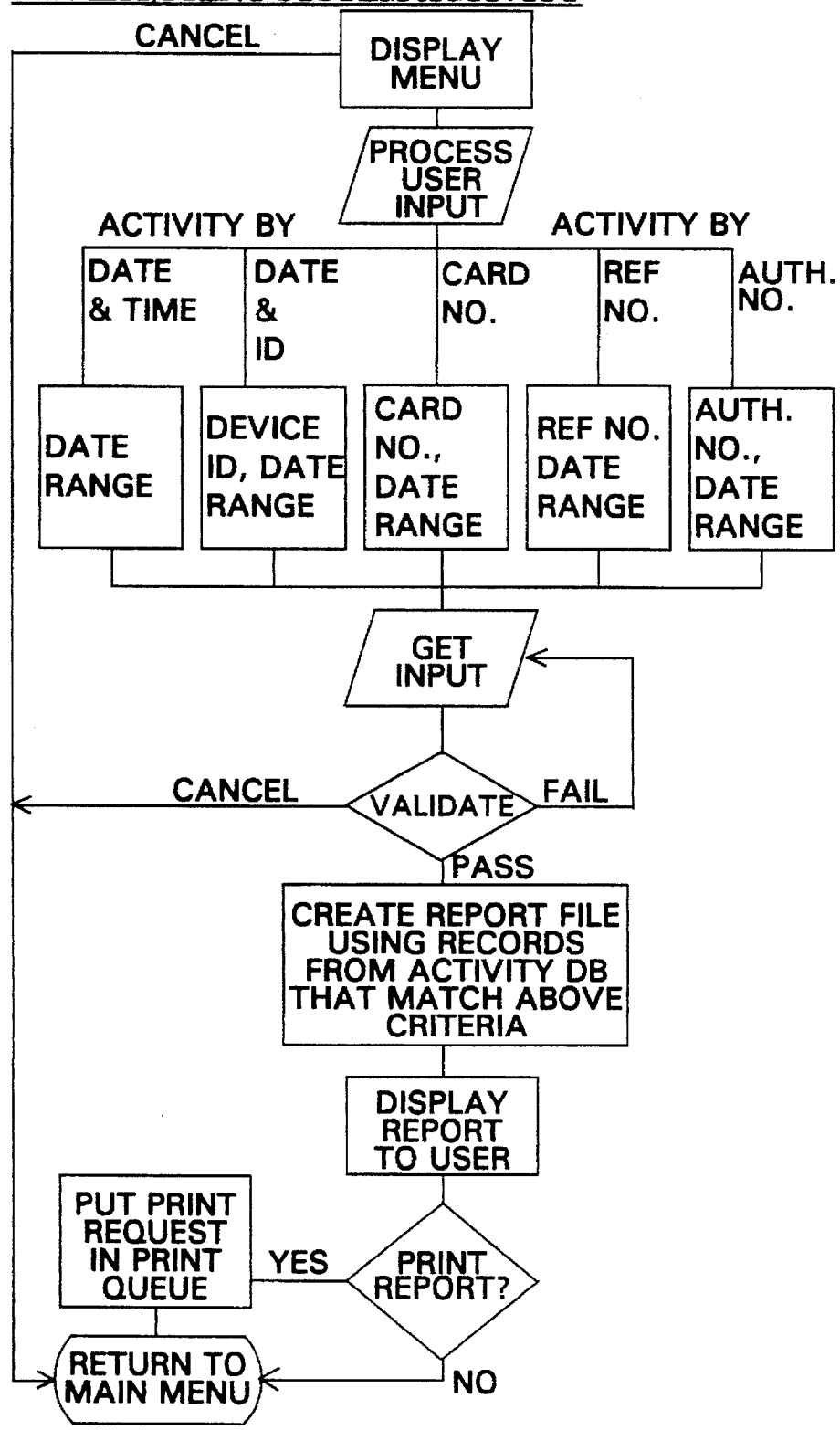
Figure 13:
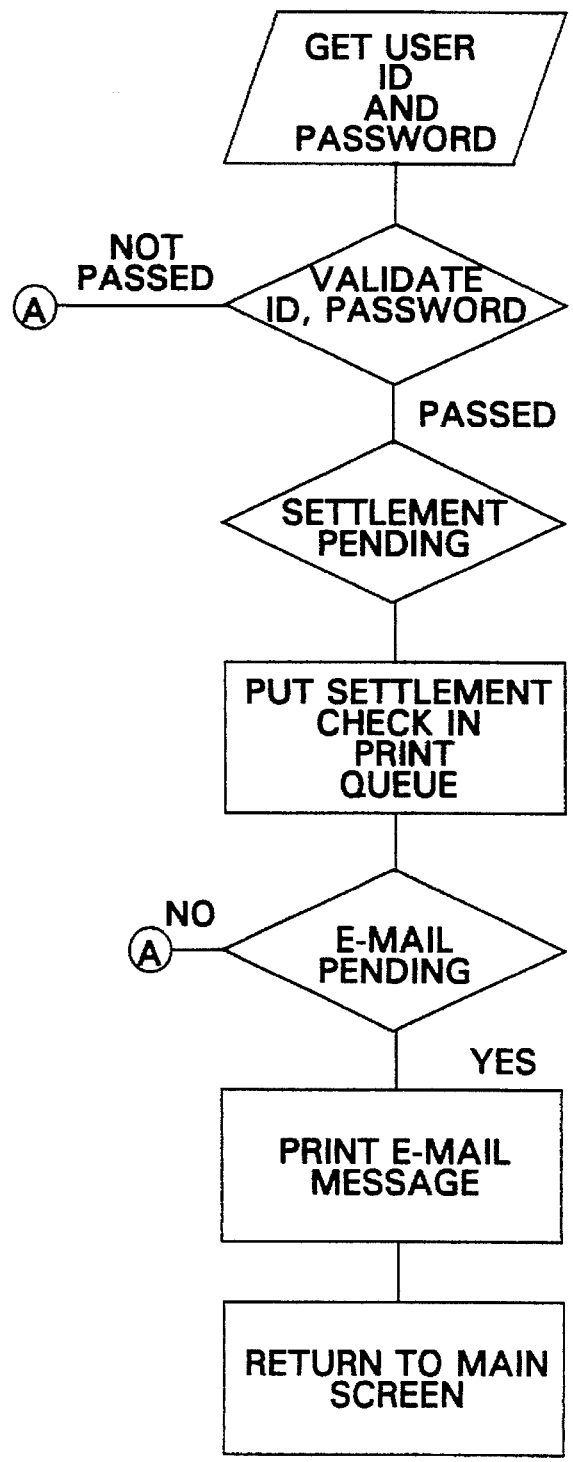
Figure 14:
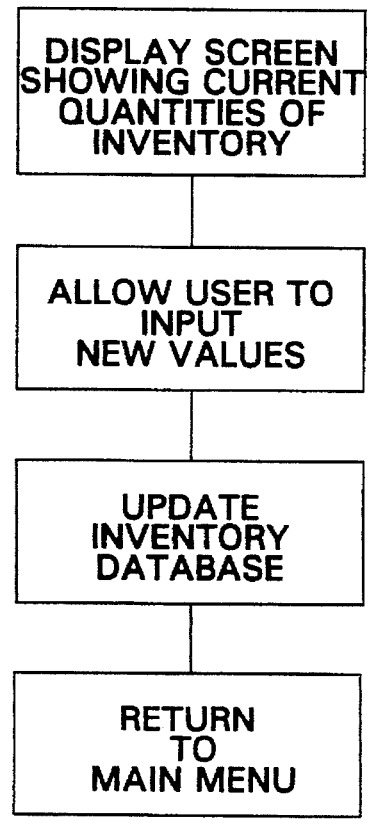
Figure 15:
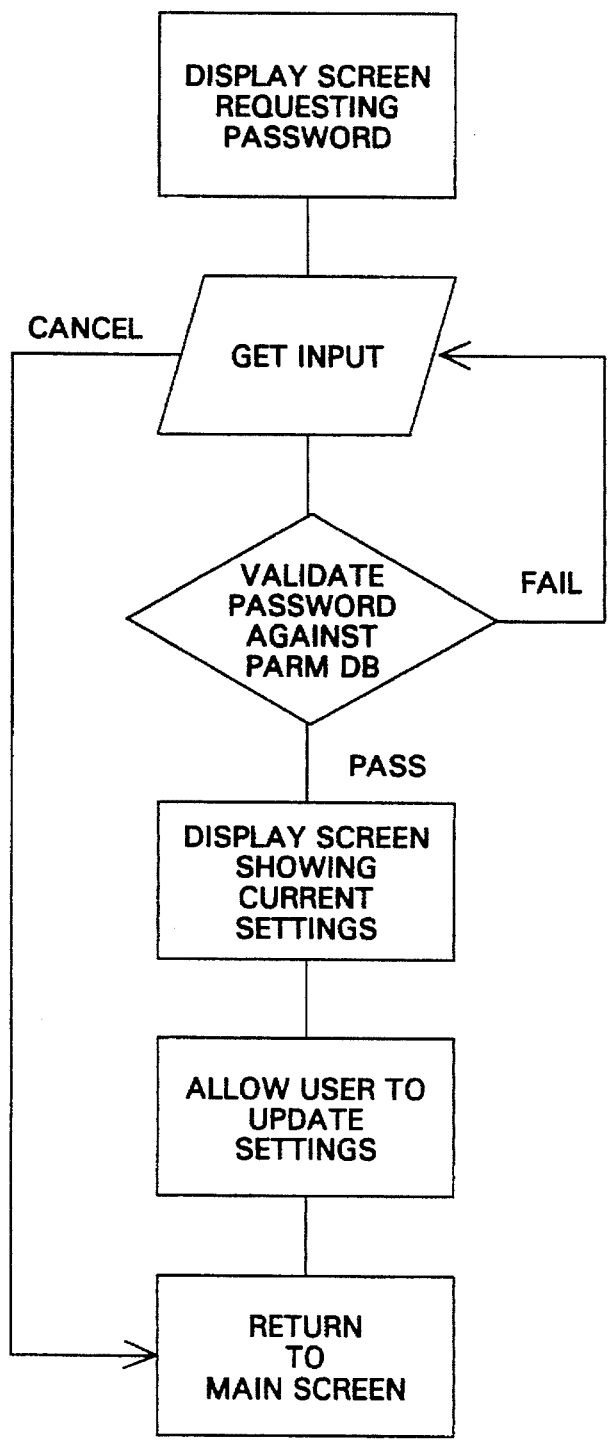
Figure 16:
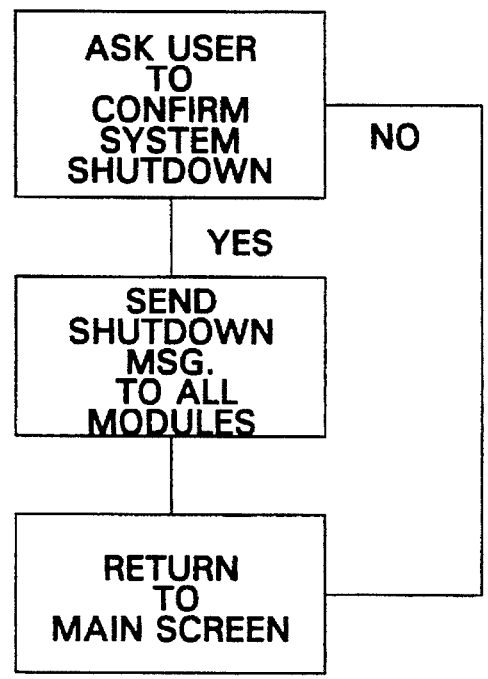
Figure 17:
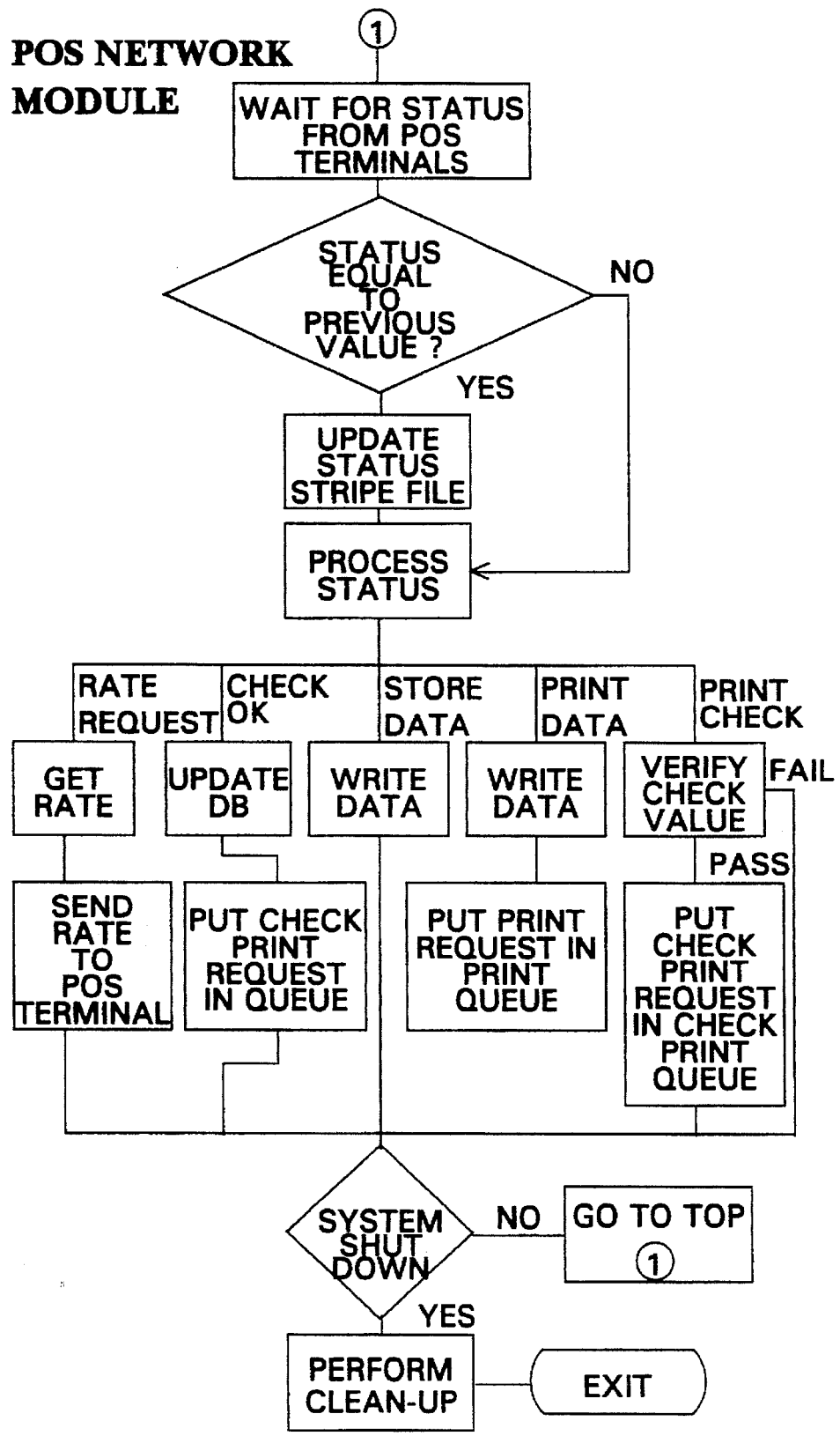
Figure 18:
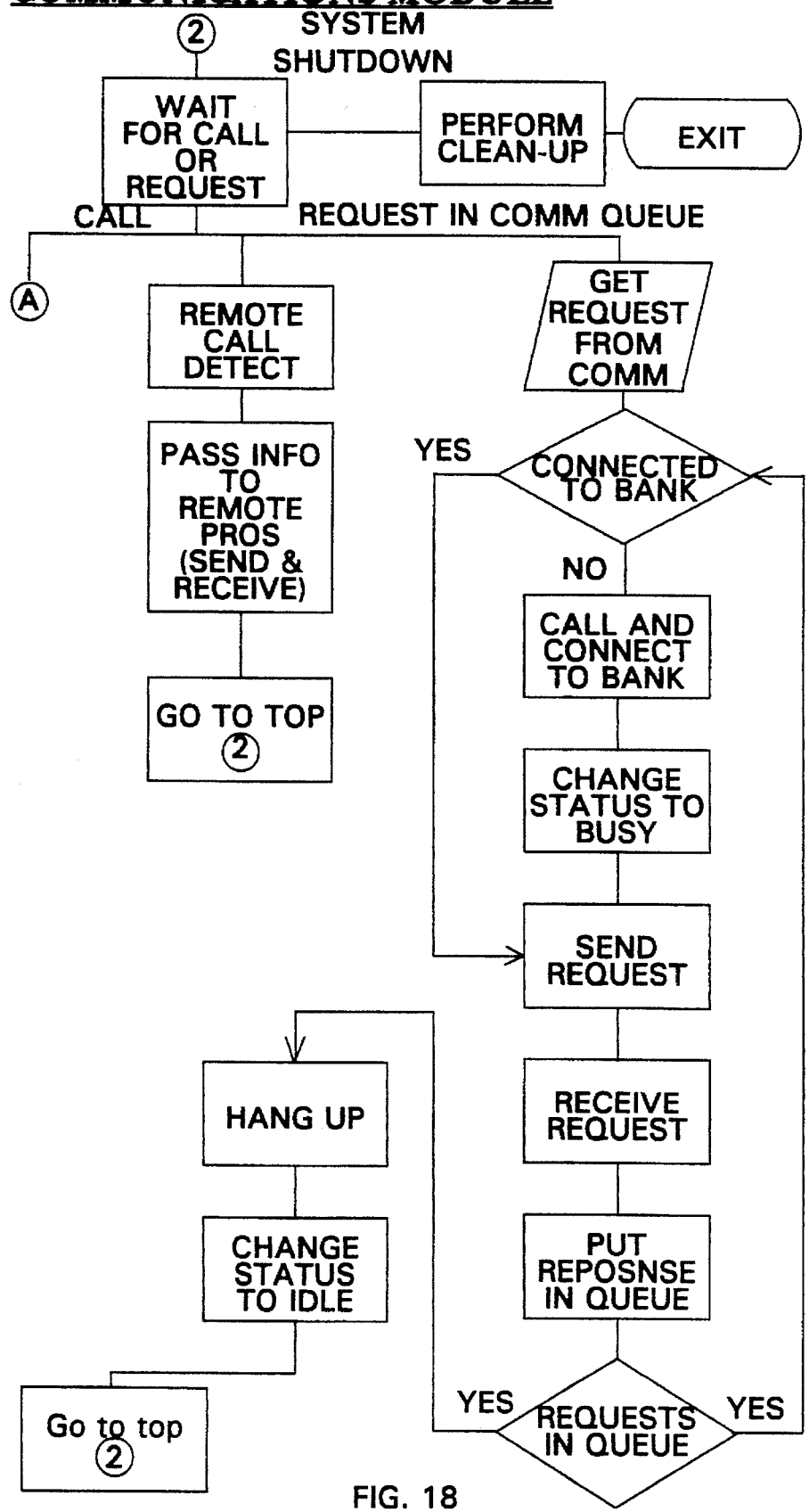
Figure 19:
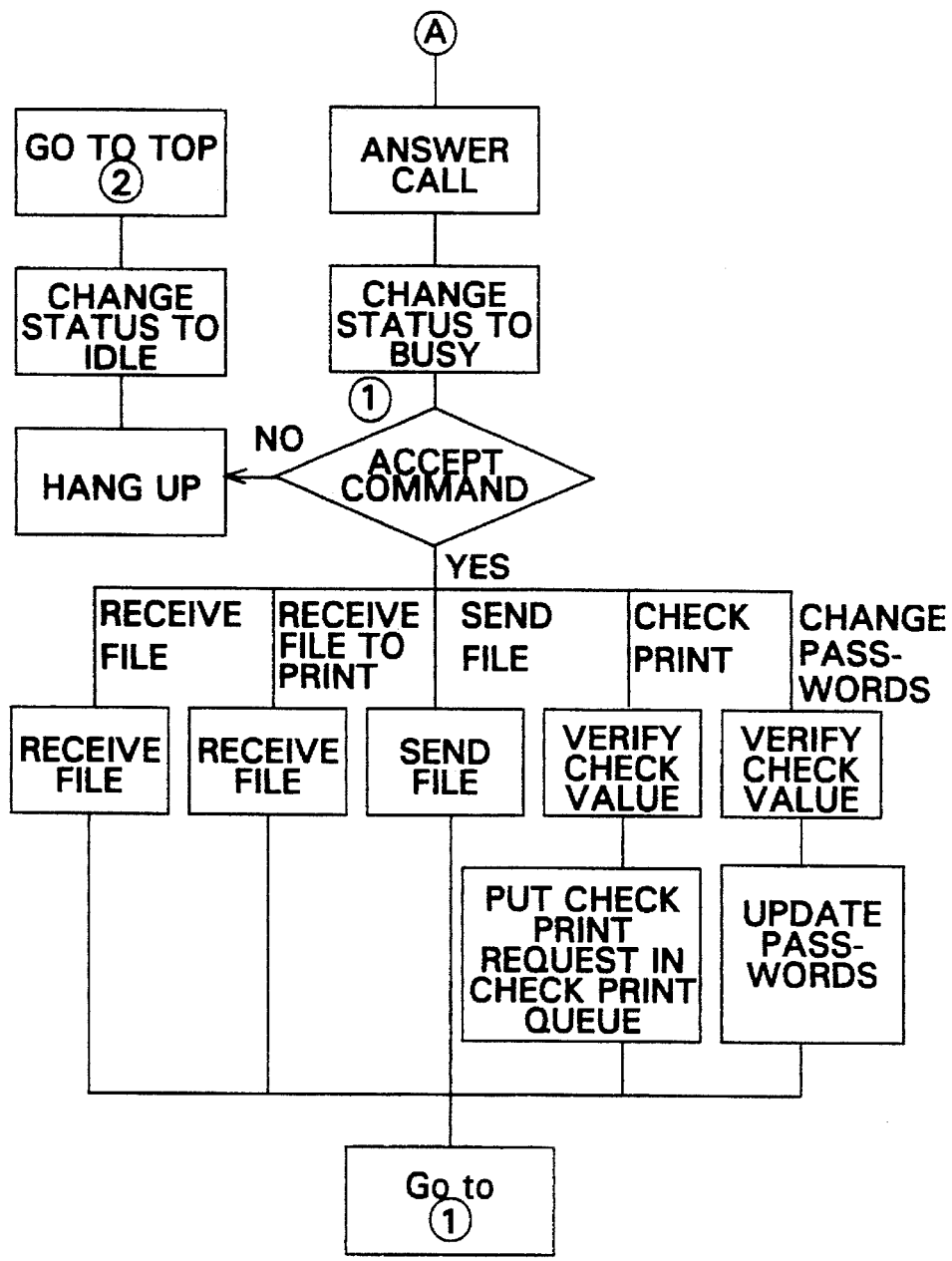
Figure 20:
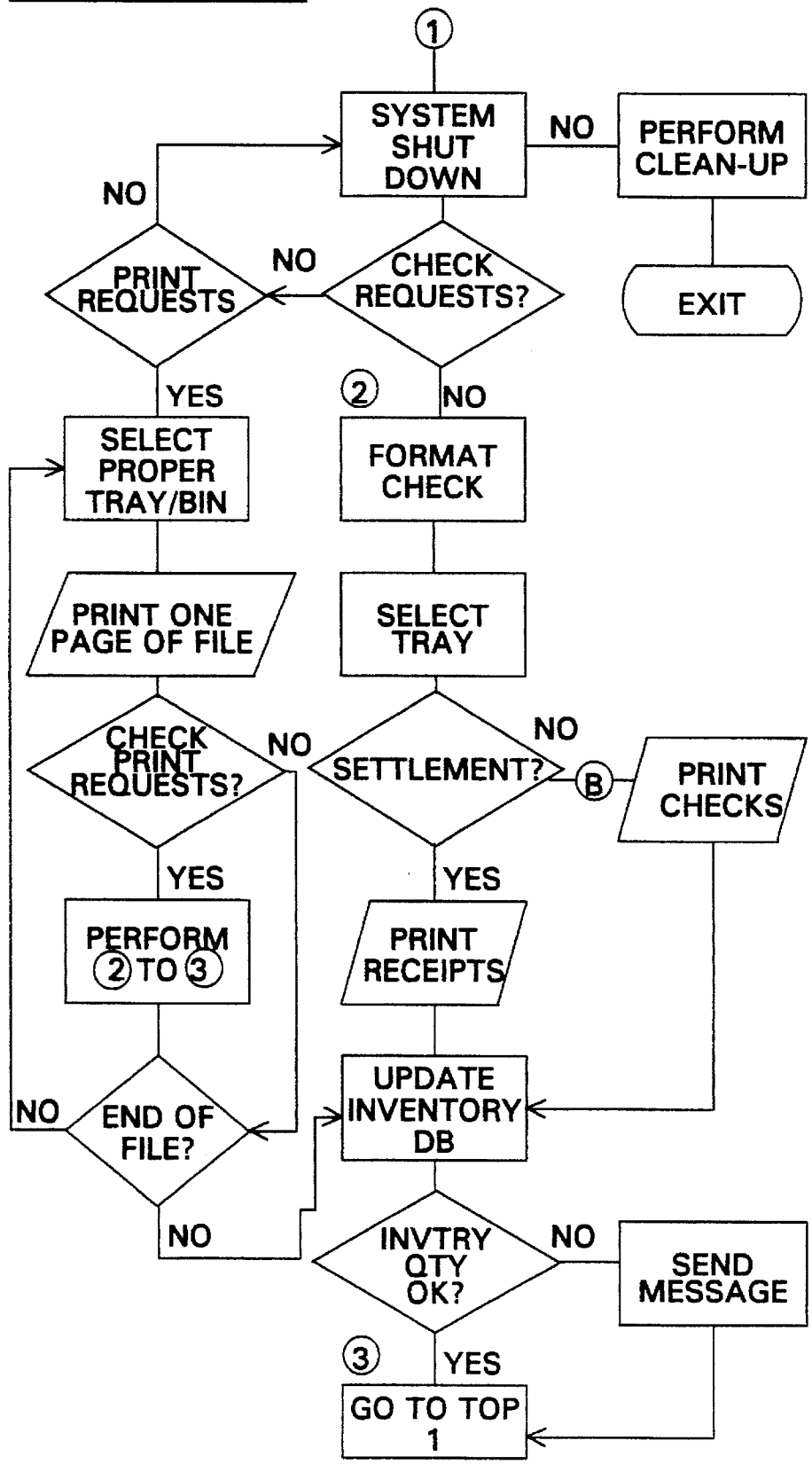
Figure 21:
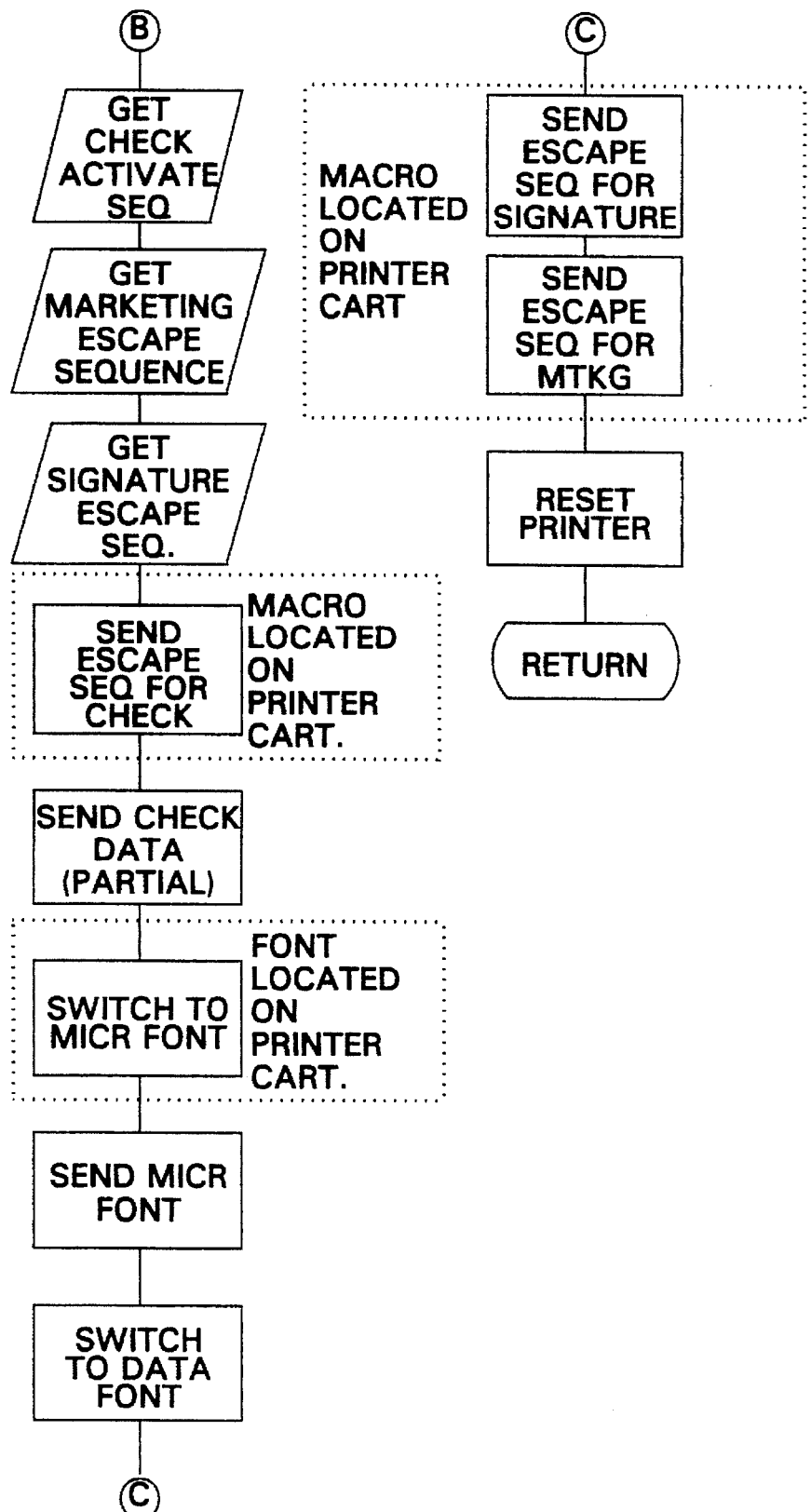
Figure 22:
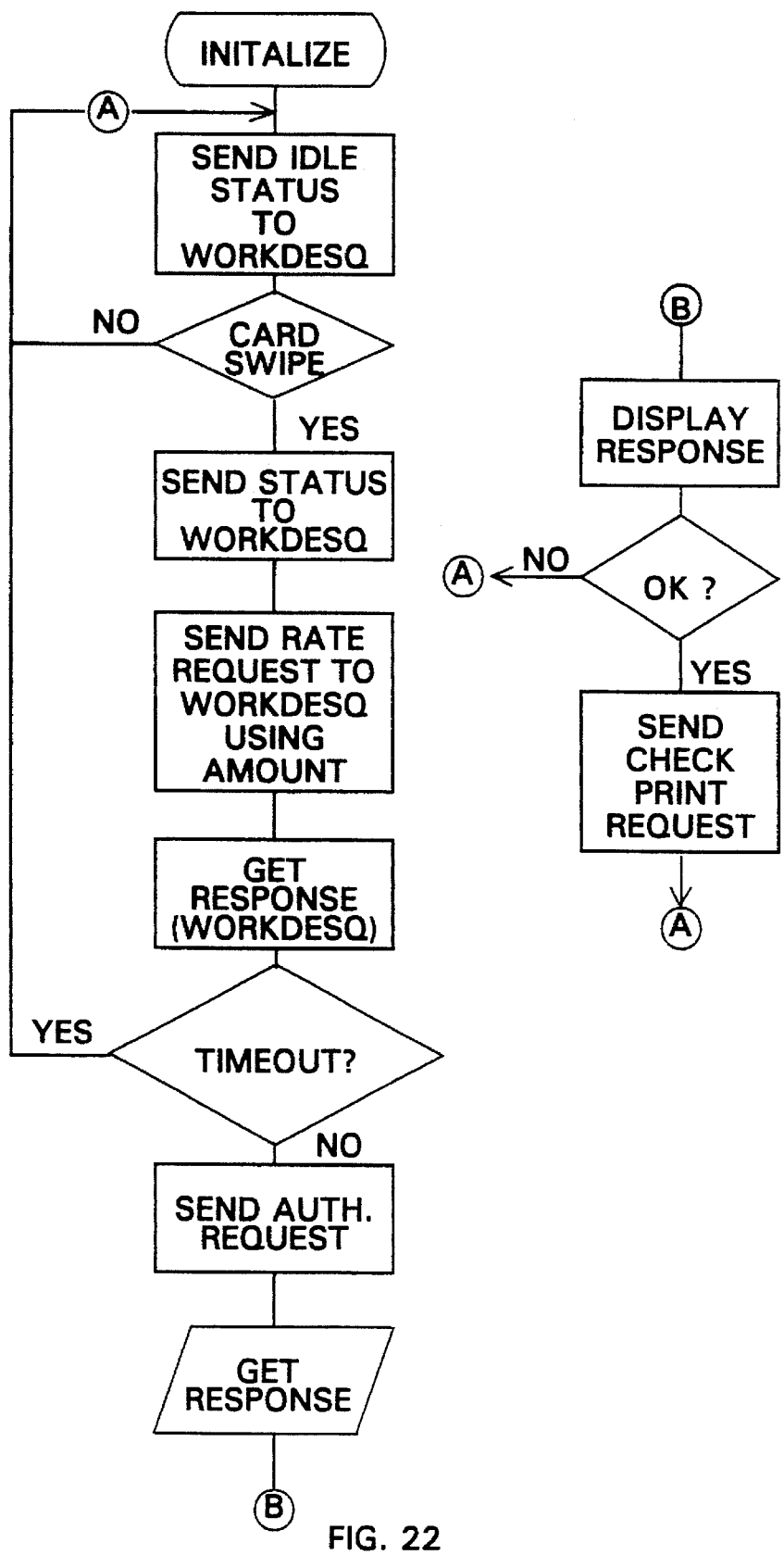
Figure 23:
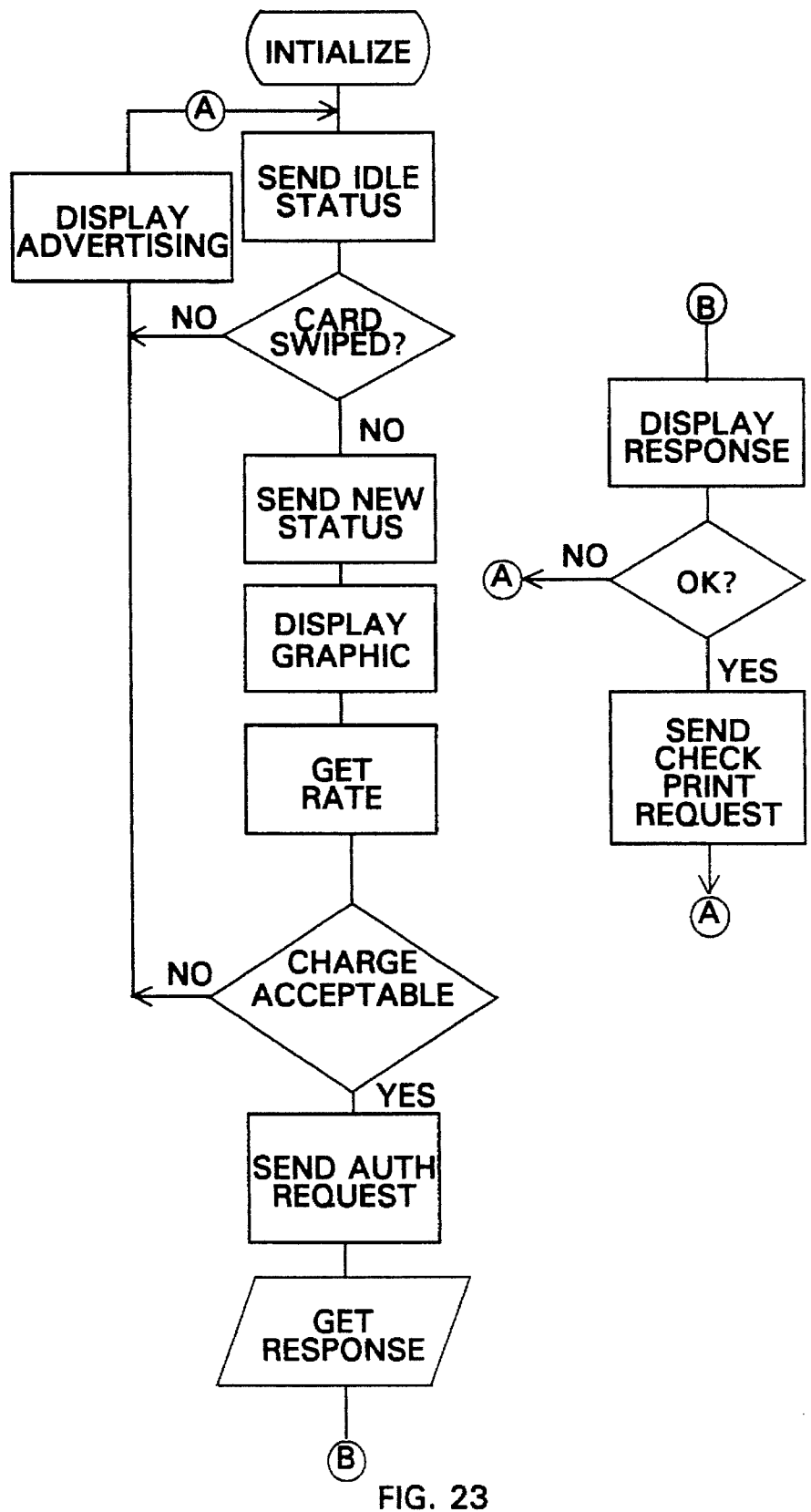

The system 10 is operated by a distributed on-line money access card transaction processing software 30 that consists of an inter-process communication (IPC) transport mechanism that operates eight modules as shown in FIG. 5.

IPC TRANSPORT MECHANISM

Figure 4:
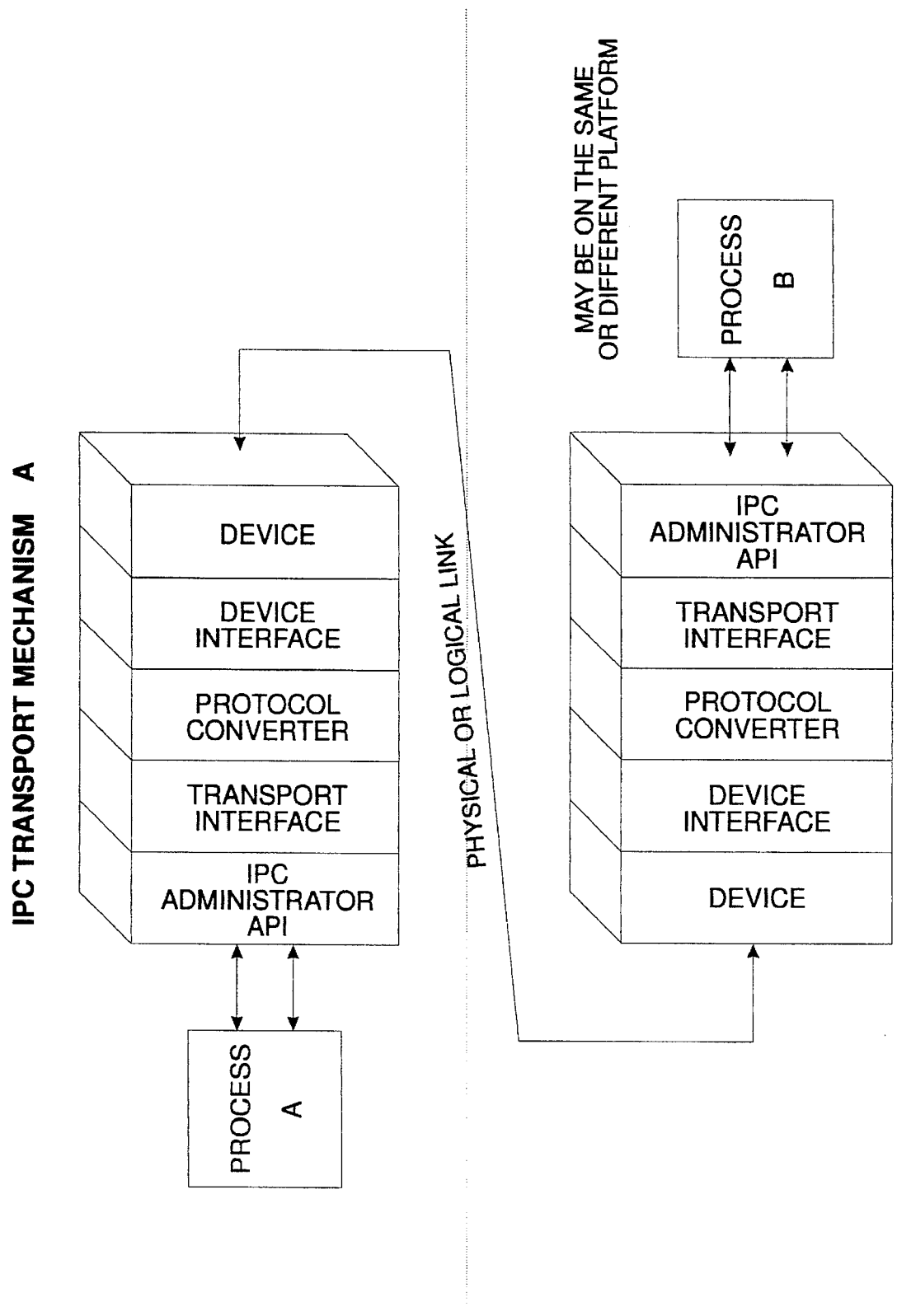
FIG. 4 is a block diagram showing the divisional categories of the IPC transport mechanism.

The IPC transport mechanism 30A functions as the "logical data bus" for the inter-process communications between distributed system processes across various physical or logical data links. This software design enables dependent processes to communicate regardless of whether the processes reside on the same platform. Thus, processes are allowed to be distributed across one or many operating platforms using various communication topologies, allowing scaling of the application or taking advantage of the inherent properties of a platform best suited to a particular process. The IPC transport mechanism 30A is divided into the following categories as shown in FIG. 4.

IPC Administrator API—This is the interface seen by each process in the system. When Process A establishes a session with Process B, the interface seen by the processes is the same regardless of whether the processes are executing on the same platform, and regardless of the physical link and protocol used to link the multiple platforms in a distributed setting.

Transport Interface—The transport interface manages connections between processes and provides a mechanism for querying process status and availability. This interface makes the distinction between local and remote processes and assigns to a connection the appropriate protocol and device interface.

Protocol Converter—the protocol converter frames data packets as required by the protocol assigned by the transport interface for transmission across the communications device linking the processes. Packets are framed by adding the necessary header, trailer, routing and error detection/correction information. This interface also manages any receipt verification, acknowledgment, and retransmission as required by the protocol. If a data packet is destined for a local process, no framing is necessary and the packet is sent immediately to the process or posted to the input queue designated for the receipt of interprocess data packets.

Device Interface—The device interface performs any initialization necessary for a physical device and handles the low-level transmission and reception of data to and from the device.

Device—The physical communications device.

KERNEL MODULE

The Kernel module 30B consists of the Task Manager and other low-level functions required on each platform running the system 10 modules. The Kernel consists of the categories described below.

Figure 3:
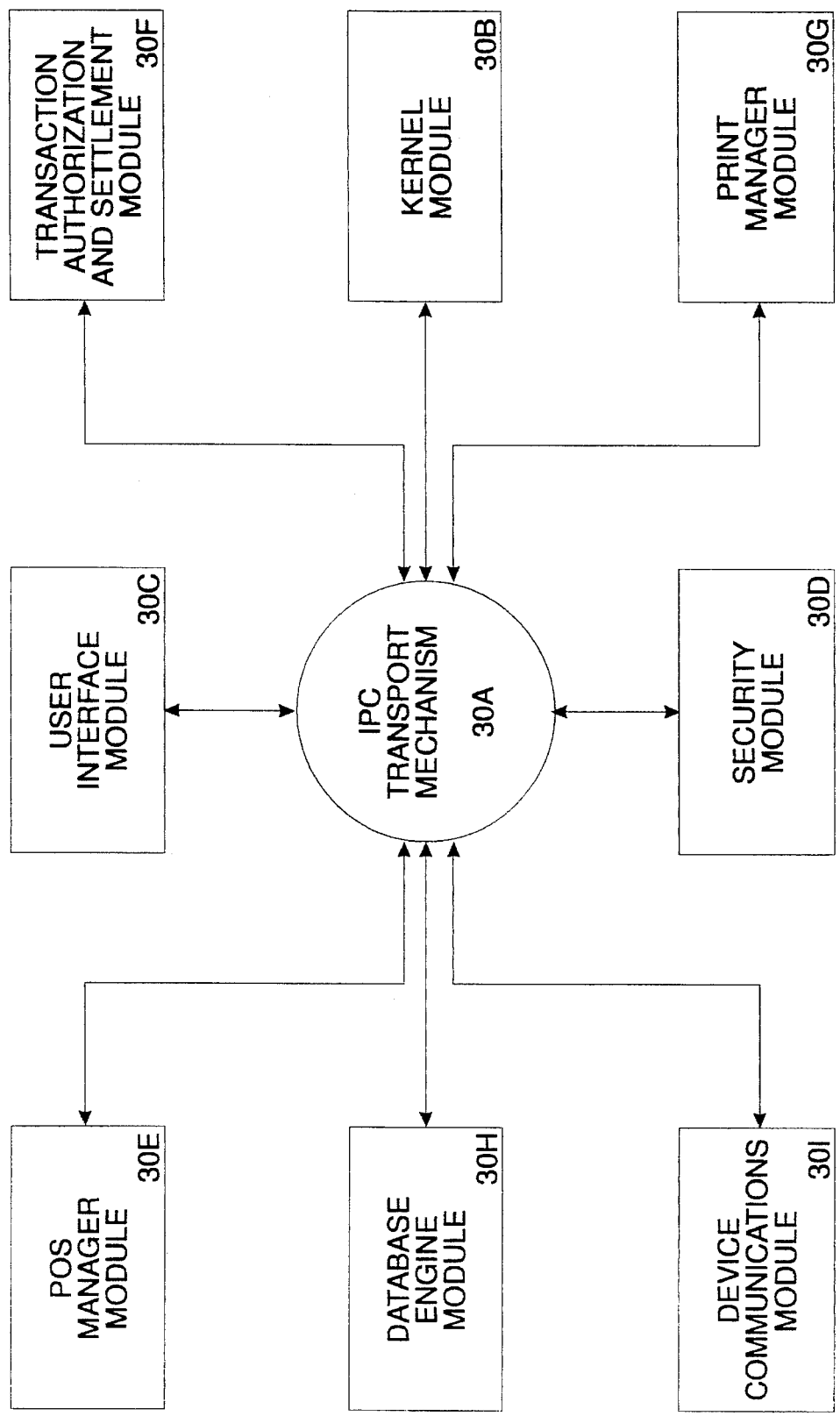
FIG. 3 is a block/functional diagram showing the operation of an IPC transport mechanism with eight software modules.

Task Manager—The Task Manager as shown in FIG. 3 uses multi-threaded non-preemptive multi-tasking technology to provide a multi-processing environment to the system 10 modules regardless of whether the host environment or operating system are capable of providing such services. Tasks use state-sequencing logic to perform small parts of an operation with each thread invocation.

Queue Manager—The Queue Manager provides functions to the system modules for creating, deleting and managing queues and queue entire (jobs). Processes that must process requests in a serial manner use the queue manager for storing pending requests and service requests from the queue in the order received.

Exception Handler—When processes generate an exception (error), a signal is sent to the exception handler. Other processes may establish exception hooks to allow them to perform the processing for designated exceptions. If an exception of a critical nature requires system shutdown, the exception handler will notify running tasks to perform the shutdown in an orderly manner.

Low-Level System Resources—Provides an interface to various system-dependent resources such as memory management, file access, and display mapping.

USER INTERFACE

The User Interface module 30C present to an operator various options for performing tasks which are carried out by other system modules. These options are presented in the form of menus, message displays and data entry screens. The user interface module translates the user options and coordinates invocation of other system processes to perform the selected task.

SECURITY

The security module 30D protects the system 10 from unauthorized access, tampering and fraudulent activities by performing the functions described below.

Password Protection—Each system operator requires a password to access the system, and the administrator of the system determines what functions may be performed by each operator.

Data Encryption—Provides a proprietary encryption mechanism for protecting sensitive data stored in files or transmitted between processes.

Hot-Card File—The system maintains a local database of credit or debit cards that are stolen or otherwise through to be involved in fraudulent activities. This allows such transactions to be stopped immediately without exposing the system operator to fraud liabilities.

Current Transaction Reporting—To comply with federal and state money-laundering protection laws, the system tracks multiple transactions performed by an individual and automatically generates the necessary regulatory reports required when the cumulative amount of transactions during the specified period meets or exceeds the amount specified by the regulation.

POS MANAGER

The POS manager module 30E processes transaction requests and coordinates the authorization and printing of the electronic checks or other transaction-generated documents. Several authorization sources may be available to the POS manager depending on the type of transaction and the current transaction volume. The POS manager will select the appropriate authorizer and pass the transaction data to the Transaction Authorization and Settlement Module for transmission to the authorizer.

TRANSACTION AUTHORIZATION AND SETTLEMENT MODULE

The Transaction Authorization and Settlement (TAS) Module 30F manages connections with the authorization network(s). At this time an authorization request is received, the TAS module will select a communications device for communicating with the authorizer. The TAS module will first try to utilize an existing connection if one is already in place. If one is not in place, an alternate device may be utilized to establish the connection, or if none is available, the request will be queued until a device becomes available. In the event of a failure to establish communications with the authorizer or a failure of an established link, the TAS module will activate alternate routing logic to establish or re-establish communications.

PRINT MANAGER

The Print Manager module 30G processes requests from other system modules for printing electronic checks and reports. These print requests are queued for printing as soon as the designated printer is available, or the Print Manager may be selected to print the report on the first available printer or to distribute the report to multiple designated printers. The Print Manager tracks the inventory levels of checks, toner and other printer related consummables. Functions are also provided for querying the status of print jobs, deleting print jobs, suspending print jobs and querying printer availability and status.

DATABASE ENGINE

The Database Engine module 30H provides a mechanism for storing transaction data and other data required through the system. The database is designed around the relation model and processes commands in a transaction oriented manner. Facilities are included to ensure data integrity, including file and record locks, integrity verification and automatic index regeneration.

The Database Engine also provides file-level management, the Shared File System. This system makes data files available to all system modules regardless of location and manages and synchronizes access to these files. Any platform running system modules may have a file area designated as a shared file area and will be managed by the shared file system.

DEVICES COMMUNICATION MODULE

The devices communication module 30I allows a variety of communicating devices to be operated by the IPC transport mechanism without needing to be aware of the specific protocols required by the devices. The major devices supported by the system are as follows.

Intelligent Workstation Adapter—The intelligent workstation adapter (IWA) is comprised of hardware and software which enables many transaction terminals to be connected through serial RS-232 interfaces to a system running on a personal computer which is normally limited to only four serial interface ports. An IWA provides 16 ports, and two IWA's may be connected to provide up to 32 ports.

Point of Salt (POS) Terminals—POS terminals are utilized by system customers to process transactions. These terminals contain a dual-track magnetic card reader for acquiring cardholder account information, a keypad for selecting options, entering transaction amounts, a display to report the progress of the transaction and request input and a receipt printer. Transaction requests are forwarded through the IPC to the POS Manager, and the result of the transaction is relayed back to the terminal which then instructs the customer of the completed transaction.

ViewChek Touch Screen Terminal—ViewChek terminals present to the customer the same options as the POS terminals but include a color flat-screen graphics display to communicate transaction progress and request customer input. The graphics display includes a touch-sensitive surface which allows a customer to select options by pointing to them on the display. In addition, the screen may be programmed to display advertising messages while the system is idle or processing.

Slave Terminals—Slave terminals provide a simple, inexpensive interface to the system for use in places where it is not practical to place an entire computer system. These terminals are connected through the IPC transport mechanism and may be programmed to perform any function available on the system. In addition, reports and electronic checks may be directed to printers attached to slave terminals.

Credit Card and Drivers License Readers—these devices are equipped with a device that is capable of reading the magnetic stripe on bank cards (debit and credit), as well as the driver's licenses being introduced in many states with magnetic encoding. This automates data recording and prevents data entry errors.

MICR Readers and Bar Code Scanners—All electronic checks printed by the system include account information (known as MICR encoding) required by the Federal Reserve for clearing. The system is equipped with a MICR reader capable of reading this information and transmitting it a system module for processing. This allows instant retrieval of transaction information and also verification of the transaction. Many documents generated by the system also contain identifying information encoded in a bar code. A bar code scanner connected to a system allows all transactions associated with a document to instantly be retrieved for viewing or processing.

Modems—Modems are used by the system for authorizing and settling transactions.

LAN/WAN Interface—The systems may be interconnected with other systems or networks to give other applications access to the system data and to allow interoperability with other systems.

The computer software flow diagrams for the system 10 are shown in FIGS. 7–22.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

We claim:

1. A distributed on-line money access card transaction processing system comprising:

A. a customer data-input/service station comprising:
  a) at least one customer data-input station comprising:
    (1) means for accepting and reading a variety of customer credit and debit bank cards,
    (2) means for querying, answering and encrypting customer transaction data,
    (3) a local point of sale (POS) software program the operates the functions of said customer data-input station,
    (4) means for printing customer transaction receipts, and
    (5) means for interfacing and communicating with a customer service station,
  b) the customer service station comprising:
    (1) at least one workstation computer having means for receiving and processing the customer transaction data received from said customer data-input station,
    (2) a local transaction software program that operates the functions of said customer service station,
    (3) a printer connected to said workstation computer and having means for electronically printing on-demand, a customer's check corresponding to the accepted customer transaction,
    (4) means for interfacing with a credit and debit bank card processing center, B. a credit and debit bank card processing center that receives a transaction from said customer service station and either accepts or rejects the transaction, C. a customer transaction booth where, if a customer transaction is approved by said credit and debit bank card processing center, the customer's check is converted to cash upon presentation of customer's identification, and D. a distributed on-line money access card transaction processing software that operates said system.

2. The system as specified in claim 1 wherein said means for accepting and reading a customer's credit and debit card comprises a bank-card reader.

3. The system as specified in claim 1 wherein said means for querying and answering a customer's transaction data comprises a touchscreen unit.

4. The system as specified in claim 1 wherein said means for querying and answering a customer's transaction data comprises a keypad that functions in combination with an alpha-numeric display.

5. The system as specified in claim 1 wherein said customer data-input station is configured in the form of a kiosk located in an easily accessible location.

6. The system as specified in claim 1 wherein said means for said customer data-input station to interface and communication with said customer service station comprises an RS232 port.

7. The system as specified in claim 1 wherein said means for said customer service station to interface and communicate with said credit and debit bank card processing center comprises a modem.

8. The system as specified in claim 1 wherein said printer is a laser printer that prints checks from electronic images stored in a laser printer using blank check stock paper, and MICR toner.

9. The system as specified in claim 1 wherein said distributed on-line money access card transaction processing software comprises:

a) an inter-process communications (IPC) transport mechanism that functions as a logical data bus for said system which provides inter-process communications between distributed system processes across various physical or logical data links, b) a kernel module that interfaces with said IPC and having means for performing low-level functions required to operate said system, where said kernel module comprises:
  (1) a task manager module having means for using multi-threaded, non-presumptive multi-tasking technology for providing a multi-processing environment to the system modules regardless of whether the host environment or operating system are capable of providing such services,
  (2) a queue manager module having means for providing to the system modules function for creating, detecting and managing queries and queue entries,
  (3) an exception handler module having means for receiving and processing an exception as error signal, and
  (4) a low-level resources module having means for providing an interface to various system-dependent resources such as memory management, file access and display mapping, c) a user interface module that interfaces with said IPC and having means for presenting to an operator various options for performing tasks which are carried out by other system modules, where the user interface module translates the user options and coordinates invocation of other system processes to perform the selected task, d) a security module that interfaces with said IPC and having means for protecting said system from unauthorized access, tampering and fraudulent activities where said security module comprises:
  (1) a password protection circuit having means for requiring a password to be entered before access is permitted to said system,
  (2) a data encryption circuit having an encryption mechanism for protecting sensitive data stored in files or transmitted between processes,
  (3) a hot-card file having means for maintaining a local data base of credit or debit cards that are stolen or otherwise thought to be involved in fraudulent activities,
  (4) a currency transaction reporting circuit having means for allowing the tracking of multiple transactions performed by an individual and thereafter, generating the necessary reports required when the cumulative amount of transactions, during a specified period meets or exceeds the amount specified by a regulation, e) a POS monitor module that interfaces with said IPC and having means for processing transaction requests and for coordinating the authorization and printing of electronic checks or other transaction generated documents, f) a transaction authorization and settlement (TAS) module that interfaces with said IPC and having means for connecting with the authorization network(s), where when an authorization is received, said TAS module selects a communication device for communicating with the authorizer, g) a print manager module that interfaces with said IPC and having means for processing request from other system modules, to print electronic checks and reports, h) a data base engine module that interfaces with said IPC and having means for providing a mechanism for storing transaction data and other data required to operate said system and i) a device communications module that interface with said IPC transport mechanism to allow said system to communicate without considering the specific protocols required by said devices.

10. The system as specified in claim 9 wherein said IPC transport mechanism is divided into the following functional categories:

a) an IPC administrator that is the interface seen by each system process, b) a transport interface having means for providing connections between processor and providing a mechanism for queuing process status and availability, c) a protocol converter having means for framing data pockets as required by the protocol assigned by the transport interface for transmission across the communication device linking the processor, d) a device interface having means for performing any initialization necessary for a physical device and for controlling the low-level transmission and reception data to and from the device and, e) a physical communication device.

11. The system as specified in claim 9 wherein said exception handler module has means for nullifying running tasks to perform a system shut down where an exception of a critical nature is received.

12. The system as specified in claim 9 wherein said user interface options are presented in the form of menus, message displays and data entry screens.

13. The system as specified in claim 9 wherein said password protection circuit further comprises circuit means for allowing a system administrator to determine which functions may be performed by each operator.

14. The system as specified in claim 9 wherein said print manager module further has circuit means for allowing checks to be printed as soon as a designated printer is available or when a first available printer is available or to distribute the report to multiple designated printers.

15. The system as specified in claim 14 wherein said print manager module further has circuit means for allowing the tracking of the inventory levels of checks and other printer related consummables.

16. The system as specified in claim 14 wherein said print manager module further comprise circuit means for allowing the queuing of the status of print jobs, deleting print jobs, suspending print jobs and printing availability and status reports.

17. The system as specified in claim 9 wherein said data base engine module further comprise circuit means for ensuring data integrity which includes file and record locks, integrity verification and automatic index regulation.

18. The system as specified in claim 17 wherein said data base engine module further comprises circuit means for allowing data files to be available to all system modules regardless of location.

19. The system as specified in claim 9 wherein said IPC transport mechanism allows processor to be distributed across at least one operating platform using various communications topologies, thus allowing scaling of the application or taking advantage of inherent properties of a platform best suited to a particular process.

20. A method for implementing a distributed on-line money access card transaction processing system that provides an improved credit card and debit bank card system, said method comprising the following steps:

a) providing a data-input station that includes a card reader and touchscreen unit or a keypad with an alphanumeric display, b) passing a credit card or bank debit card across said card reader to initiate a transaction, c) selecting the amount of the transaction, and the method of payment by touching appropriate sections of said touchscreen or the keys on said keypad, d) viewing touchscreen unit to determine if the transaction has been approved or rejected, if a rejection is received, the reason for the rejection is displayed on said touchscreen, or alpha-numeric display, if an approval is received, a check is electronically printed with the approved amount on a printer located in a customer service station, and e) proceeding to a customer transaction booth where the check is presented, with proper identification, afterwhich customer receives a cash payment.

* * * * *